US008783727B2

(12) United States Patent
Flaman

(10) Patent No.: US 8,783,727 B2
(45) Date of Patent: Jul. 22, 2014

(54) RETRACTABLE VEHICLE MUD FLAP

(71) Applicant: Peter J. Flaman, Vibank (CA)

(72) Inventor: Peter J. Flaman, Vibank (CA)

( * ) Notice: Subject to any disclaimer, the term of this patent is extended or adjusted under 35 U.S.C. 154(b) by 0 days.

(21) Appl. No.: 13/961,506

(22) Filed: Aug. 7, 2013

(65) Prior Publication Data

US 2014/0042736 A1 Feb. 13, 2014

Related U.S. Application Data

(60) Provisional application No. 61/681,892, filed on Aug. 10, 2012.

(51) Int. Cl.
*B62D 25/18* (2006.01)
(52) U.S. Cl.
USPC .......................................... 280/851; 280/852
(58) Field of Classification Search
USPC ........... 280/848, 851, 859, 847; 137/354, 355
See application file for complete search history.

(56) References Cited

U.S. PATENT DOCUMENTS

| 5,582,431 | A | * | 12/1996 | Anderson | 280/851 |
|---|---|---|---|---|---|
| 6,446,900 | B1 | | 9/2002 | Syska et al. | |
| 6,799,808 | B1 | | 10/2004 | Walters | |
| 7,931,302 | B2 | * | 4/2011 | Vaughn | 280/851 |
| 8,465,058 | B1 | * | 6/2013 | Herrera | 280/847 |

* cited by examiner

*Primary Examiner* — John Walters
*Assistant Examiner* — James Triggs
(74) *Attorney, Agent, or Firm* — Ryan W. Dupuis; Kyle R. Satterthwaite; Ade & Company Inc.

(57) ABSTRACT

A retractable mud flap assembly has a housing suspended from a vehicle hitch receiver tube so as not to interfere with mounting of a hitch ball thereon. The housing receives a rotatable shaft therein upon which a flexible mud flap panel can be rolled into the housing in a stored position. The housing has a lower dispensing slot between opposing flanges through which a portion of increased thickness of the panel cannot pass. A tool attachment portion is supported at one end of the shaft for selective attachment of an auxiliary handle member or rotary tool for example. A radial locking member on the housing selectively engages shaft to lock the panel in either the stored position or a working position suspended from the dispensing slot.

18 Claims, 5 Drawing Sheets

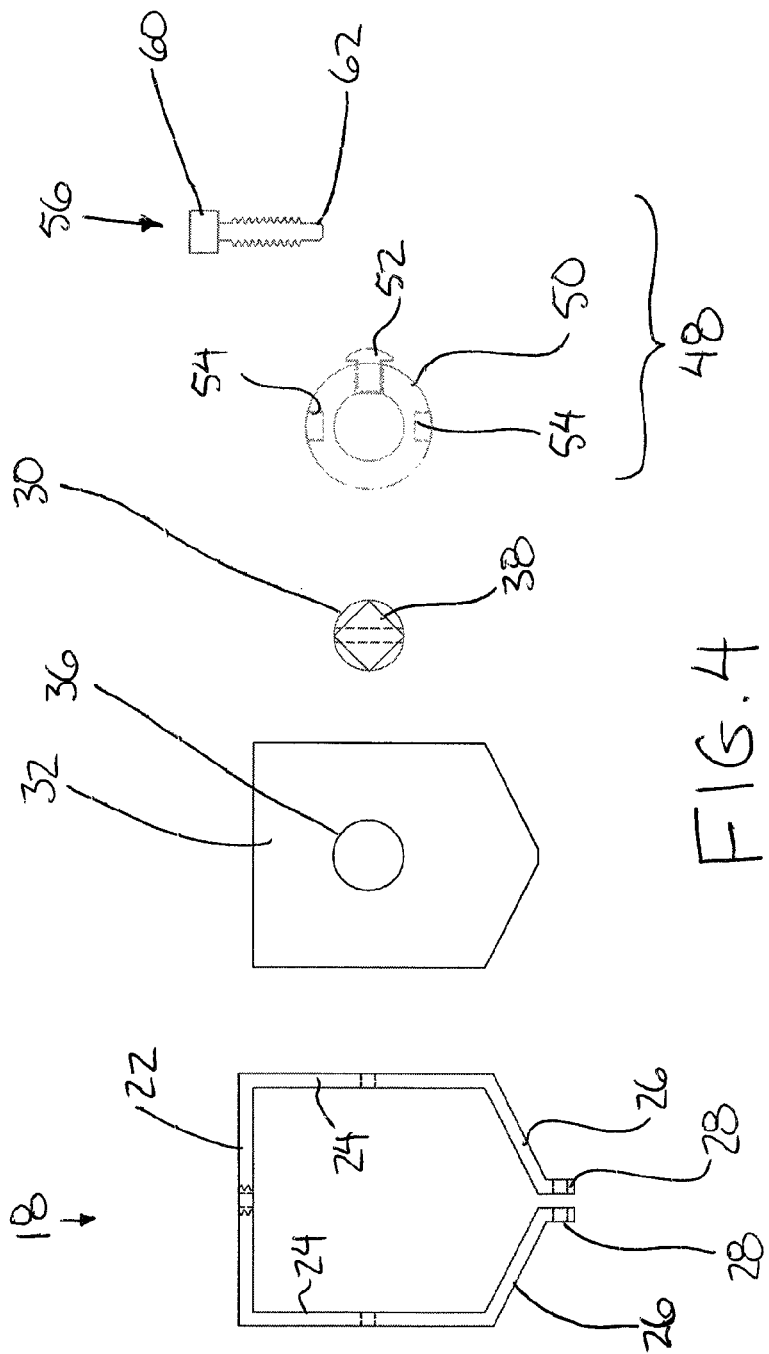

RETRACTABLE VEHICLE MUD FLAP

This application claims the benefit under 35 U.S.C. 119(e) of U.S. provisional application Ser. No. 61/681,892, filed Aug. 10, 2012.

FIELD OF THE INVENTION

The present invention relates to a retractable mud flap for a vehicle which is arranged to be rolled up onto a shaft in a stored position, and more particularly the present invention relates to a roll-up mud flap arranged to be stored within an enclosed housing about the shaft which can be suspended from a hitching portion of the vehicle.

BACKGROUND

Mud guards are well known for guarding against various road debris thrown rearwardly from the wheels of a vehicle by being positioned rearwardly of the wheels to catch the thrown debris. On towing vehicles in particular it is desirable to provide mud guards, otherwise known as tow guards or tow flaps and the like, which extend substantially the full width of the vehicle to catch the debris being thrown rearward towards a towed object to in turn protect the towed object.

When not towing an article behind the towing vehicle however, it is desirable to remove the tow guard as it is cumbersome and unattractive in appearance. Known designs of tow guards typically require the entire assembly to be removed which can be awkward and time consuming.

U.S. Pat. No. 6,446,900 by Syska et al, U.S. Pat. No. 6,799,808 by Walters, and U.S. Pat. No. 5,582,431 by Anderson disclose examples of mud guards which can be retracted, however the configuration in each instance is particularly suited for larger industrial vehicle and are thus generally too large and cumbersome for passenger vehicles. Furthermore, the mounting configuration in each instance is not well suited for accommodating a large variety of different vehicles.

SUMMARY OF THE INVENTION

According to one aspect of the invention there is provided a retractable mud flap assembly for a motor vehicle supported on wheels for movement in a forward working direction, the assembly comprising:

a housing extending in a lateral direction between two opposing ends;

a hitch attachment arranged to suspend the housing from a hitching portion of the vehicle rearward of the wheels such that the lateral direction is perpendicular to the forward working direction of the vehicle;

a shaft supported by the housing for rotation about an axis of the shaft oriented in the lateral direction; and a mud flap panel spanning longitudinally between an inner edge secured to the shaft and an opposing free outer edge;

the mud flap panel being formed of a flexible material so as to be movable between a working position depending downwardly from the housing towards the free outer edge and a stored position rolled onto the shaft.

Preferably the hitch attachment comprises a bracket arranged to be secured about a hitch receiver tube on the vehicle in a manner which does not interfere with mounting of a hitch ball relative to the hitch receiver tube.

By providing a housing supporting a roll-up mud flap therein which can be readily supported from a hitch receiver tube, the roll-up mud flap is readily adaptable to a large variety of vehicles. The roll-up configuration of the mud flap is also convenient for storing the mud flap without requiring removal from the vehicle.

Preferably the hitch attachment is arranged to wholly suspend the housing from the hitching portion of the vehicle such that the housing is only supported on the hitching portion of the vehicle.

The hitch attachment may comprise a bracket arranged to be secured about the hitching portion of the vehicle using threaded fasteners such that the housing is selectively separable from the vehicle.

Preferably the housing is fully enclosed about the shaft.

The housing may include two flanges spanning laterally between the opposing ends parallel to one another to define a dispensing slot therebetween in which the mud flap panel is received through the dispensing slot between the two flanges. The mud flap panel in this instance may include a portion of increased thickness at the outer free edge which cannot pass through the dispensing slot.

Preferably the mud flap panel includes a rigid weighted member spanning along the outer free edge along a full width of the panel in the lateral direction.

Preferably a tool attachment portion is supported at one end of the shaft so as to be arranged selective attachment to an auxiliary handle member for manually driving rotation of the shaft. The tool attachment portion may protrude outwardly beyond the housing in the lateral direction. Preferably the tool attachment portion comprises an end portion of the shaft having a cross section perpendicular to the lateral direction which is polygonal.

Preferably a locking member is supported on the housing for movement in a radial direction relative to the shaft between a disengaged position in which the shaft is freely rotatable and an engaged position in which the locking member engages to the shaft so as to prevent rotation of the shaft relative to the housing. The locking member is preferably in threaded connection with the housing such that rotation of the locking member about a respective longitudinal axis displaces the locking member in the radial direction relative to the shaft. When sockets are located at circumferentially spaced apart positions on the shaft, the locking member preferably comprises an inner end portion arranged to be received in a selected one of the sockets in the engaged position.

According to a second aspect of the present invention there is provided a retractable mud flap assembly for a motor vehicle supported on wheels for movement in a forward working direction, the assembly comprising:

a housing extending in a lateral direction between two opposing ends and being arranged to be supported on the vehicle rearward of the wheels such that the lateral direction is perpendicular to the forward working direction of the vehicle;

a shaft supported by the housing for rotation about an axis of the shaft oriented in the lateral direction; and a mud flap panel spanning longitudinally between an inner edge secured to the shaft and an opposing free outer edge;

the mud flap panel being formed of a flexible material so as to be movable between a working position depending downwardly from the housing towards the free outer edge and a stored position rolled onto the shaft; and the housing being fully enclosed about the shaft.

The housing may further include two flanges spanning laterally between the opposing ends parallel to one another to define a dispensing slot therebetween in which the mud flap panel is received through the dispensing slot between the two flanges. In this instance the mud flap panel may further include a portion of increased thickness at the outer free edge which cannot pass through the dispensing slot.

According to a third aspect of the present invention there is provided a retractable mud flap assembly for a motor vehicle supported on wheels for movement in a forward working direction, the assembly comprising:

a housing extending in a lateral direction between two opposing ends and being arranged to be supported on the vehicle rearward of the wheels such that the lateral direction is perpendicular to the forward working direction of the vehicle;

a shaft supported by the housing for rotation about an axis of the shaft oriented in the lateral direction;

a mud flap panel spanning longitudinally between an inner edge secured to the shaft and an opposing free outer edge; and a tool attachment portion supported at one end of the shaft so as to be arranged selective attachment to an auxiliary handle member;

the mud flap panel being formed of a flexible material so as to be movable between a working position depending downwardly from the housing towards the free outer edge and a stored position rolled onto the shaft.

Preferably the tool attachment portion comprises an end portion of the shaft having a cross section perpendicular to the lateral direction which is polygonal and protrudes outwardly beyond the housing in the lateral direction such that the tool attachment portion can be readily attached to an auxiliary handle member, or optionally received within the chuck of a powered rotary drill for example.

The assembly may further include a locking member supported on the housing for movement in a radial direction relative to the shaft between a disengaged position in which the shaft is freely rotatable and an engaged position in which the locking member engages to the shaft so as to prevent rotation of the shaft relative to the housing.

One embodiment of the invention will now be described in conjunction with the accompanying drawings in which:

BRIEF DESCRIPTION OF THE DRAWINGS

FIG. 4 is an exploded end view of the retractable mud flap assembly;

In the drawings like characters of reference indicate corresponding parts in the different figures.

DETAILED DESCRIPTION

Figure 1:
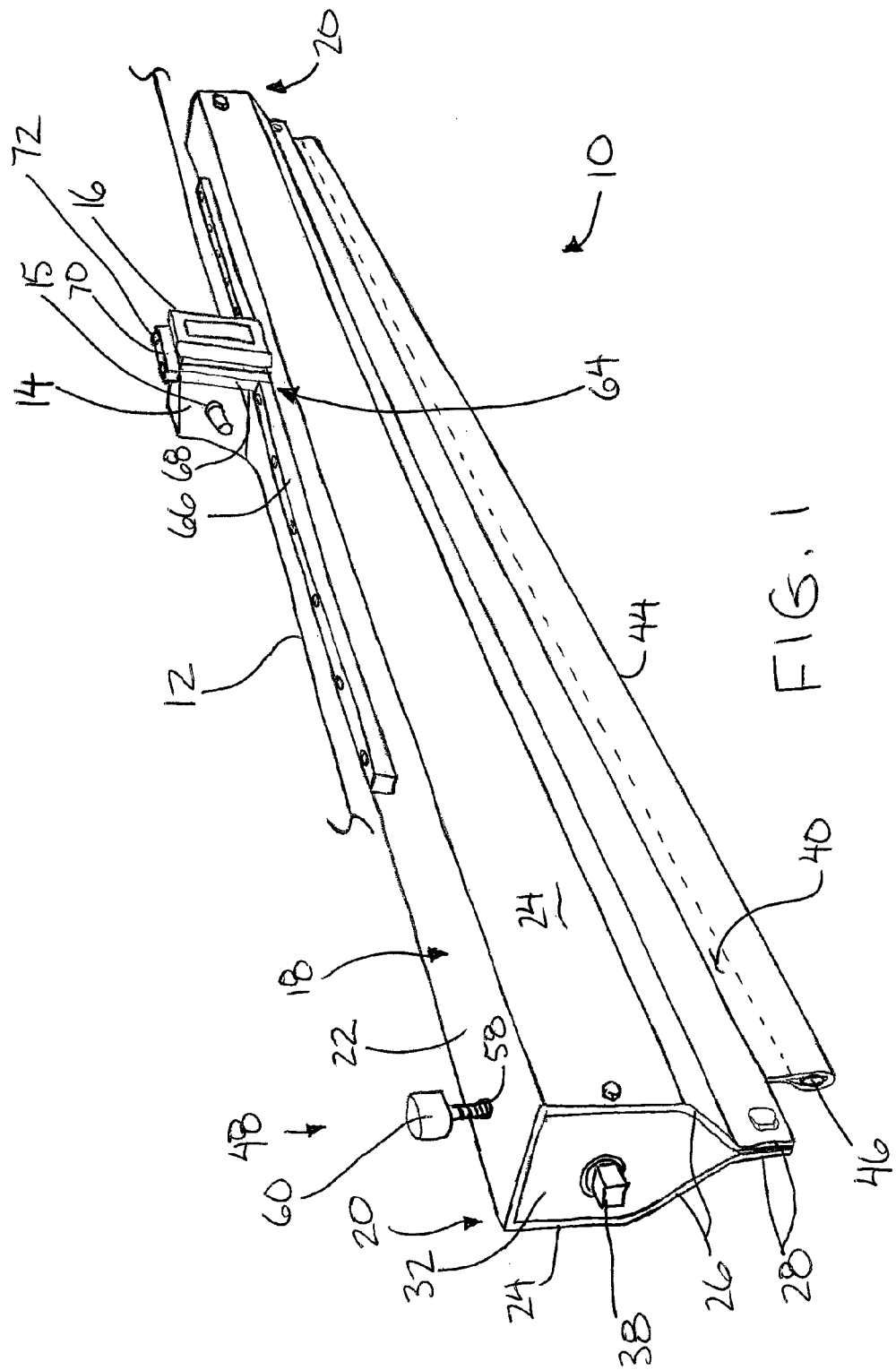
FIG. 1 is a perspective view of the retractable mud flap assembly shown supported on the hitch receiver tube of a vehicle.
Figure 2:
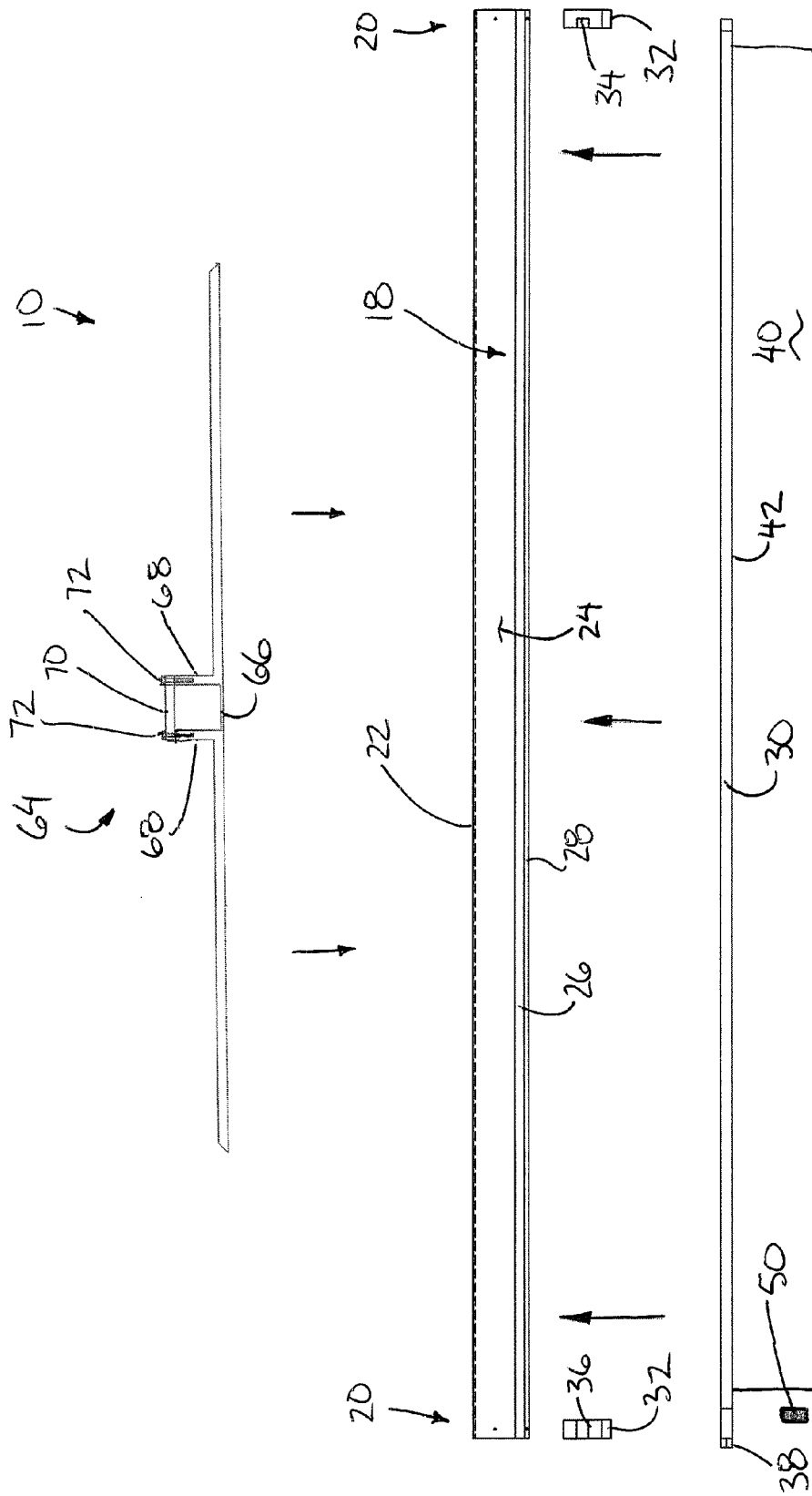
FIG. 2 is an exploded rear view of the retractable mud flap assembly.
Figure 3:
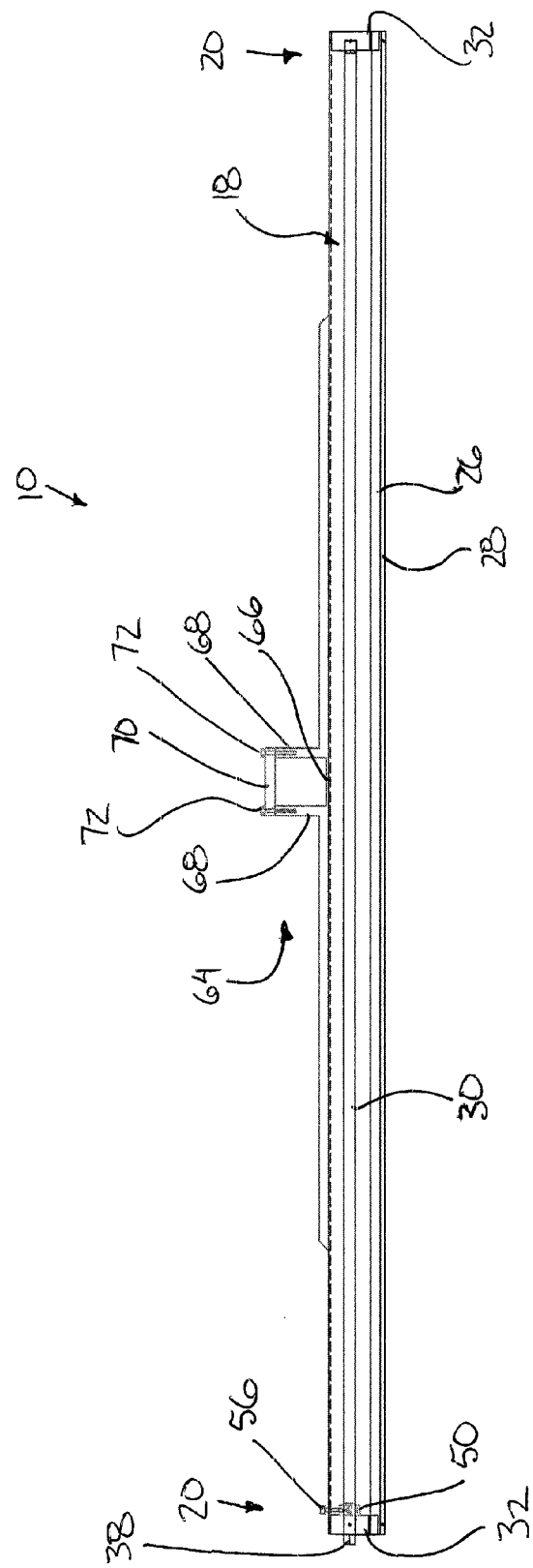
FIG. 3 is a rear view of the retractable mud flap assembly in an assembled configuration.
Figure 6:
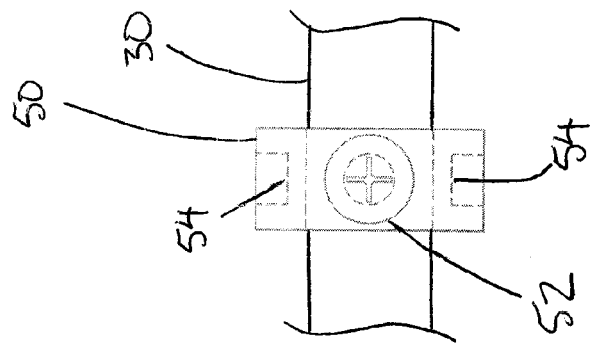
FIG. 6 is a side view of a locking collar on the shaft of the retractable mud flap assembly.
Figure 5:
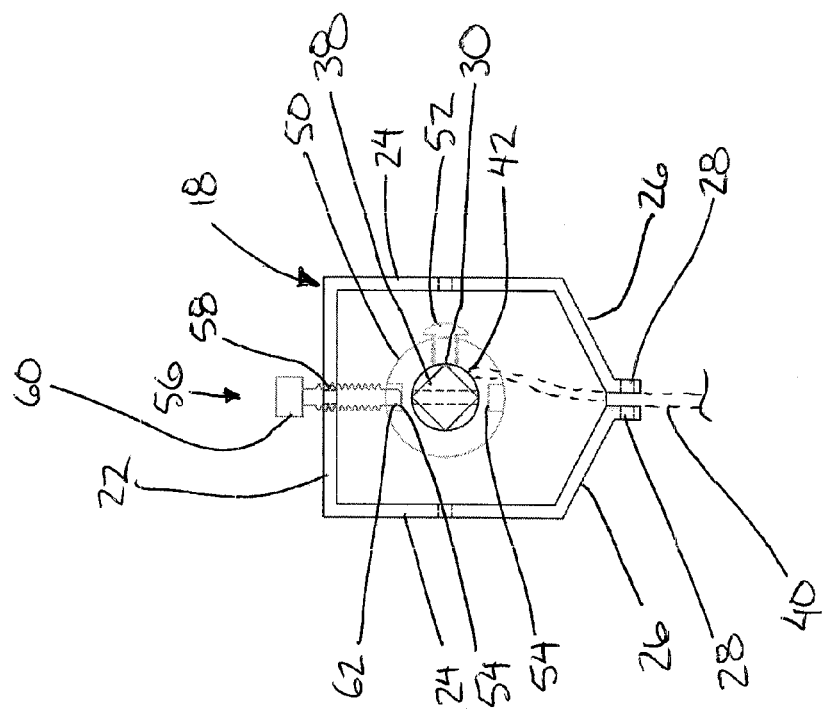
FIG. 5 is an end view of the retractable mud flap assembly in an assembled configuration.

Referring to the accompanying figures, there is illustrated a retractable mud flap assembly generally indicated by reference numeral 10. The assembly 10 is particularly suited for use with a typical motor vehicle 12 supported on wheels for rolling movement in a forward working direction. The vehicle also includes a hitching portion in the form of a hitch receiver tube 14 mounted at the rear of the vehicle.

Typically the hitch receiver tube includes an open rear end arranged to receive the stem of a hitch ball slidably therein such that the stem is readily releasable for storage as may be desired. Cooperating apertures 15 are located in the stem and the hitch tube 14 for receiving a pin transversely therethrough to retain the stem in a mounted position. The apertures are spaced forwardly from the open rear end of the hitch tube. A peripheral flange 16 projects outwardly from the end of the tube about the periphery of the opening of the tube to strengthen the mouth area of the receiver tube.

The retractable mud flap assembly 10 includes a housing 18 which is elongate in a lateral direction between two opposing ends 20. The housing has a top wall 22 which is generally rectangular and spans the full width in the lateral direction in a horizontal orientation. Two side walls 24 depend vertically downward from respective ones of the opposing sides of the top wall along the full length thereof such that the side walls are parallel and spaced apart from one another.

A bottom wall 26 is formed integrally with the bottom edge of each side wall such that the two bottom walls taper downwardly and inwardly towards one another to respective bottom edges adjacent one another. Two bottom flanges 28 are joined to the bottom edges of the two bottom walls 26 respectively to extend vertically downward therefrom parallel and adjacent to one another. The flanges are in close proximity to define a narrow dispensing slot therebetween which spans the full width of the housing between the opposing ends.

The top wall, the two side walls, the bottom walls and the bottom flanges are all integrally formed of a single sheet of rigid metal which has been bent and shaped into the desired configuration and with all of the walls and flanges spanning a full width in a lateral direction between the two opposing ends.

The housing is arranged to rotatably support a shaft 30 therein such that the shaft is fully enclosed as surrounded by the housing. The shaft 30 is supported for rotation at opposing ends thereof on the opposing ends 20 of the housing by a pair of end caps 32 for rotation about a longitudinal axis of the shaft oriented in a lateral direction.

The two end caps 32 span the respective opposing ends of the housing to fully enclose the housing. Each of the caps comprises a plastic molded member of suitable shape to be received between the two side walls and between the top wall and the two bottom walls. Fasteners can be secured through the side walls and into the body of the caps respectively to secure them in place in a mounted position.

A first one of the caps 32 comprises an enclosed cap which is fully enclosed at the outer side and includes a terminal socket 34 at the inner side which receives a respective one of the ends of the shaft rotatably therein such that the shaft is generally centered relative to the walls of the housing.

The other cap 32 includes a through aperture 36 formed therein to receive the shaft extending therethrough at the other end of the shaft so that the shaft is similarly rotatably supported relative to the housing at a central location relative to the walls of the housing.

A portion of the shaft protruding through the aperture 36 at one of the end caps defines a protruding end portion 38 protruding laterally outward beyond the end of the housing to define a tool attachment where a suitable tool can be connected for driving rotation of the shaft relative to the housing. In the illustrated embodiment, the protruding end portion 38 has a square cross section perpendicular to the longitudinal axis of the shaft; however, other polygonal cross sections such as a hexagonal cross section may provide a similar function of attaching various tools.

In some instances an auxiliary handle member for manually cranking the rotation of the shaft can be attached in a readily releasable manner to the protruding end portion 38 of the shaft.

Alternatively, the end portion may be received within the chuck of a powered rotary tool or may connect to a socket of a ratchet wrench for example.

The assembly 10 further includes a mud flap panel 40 which is supported to be selectively rolled up onto the shaft within the housing. The panel spans in a longitudinal direction between an inner edge 42 secured along a full width of the shaft in the lateral direction and an opposing outer free edge 44. An intermediate portion of the panel between the inner and outer edges passes through the dispensing slot between the two bottom flanges 28.

The panel comprises a thin flexible sheet of material having a thickness approximately equal to the thickness of the slot between the two bottom flanges 28 so that the panel can readily pass through the slot while preventing accumulation of debris on the panel from entering into the housing.

The free outer edge of the panel is folded and secured to the panel to define a pocket spanning in the lateral direction across the full width of the panel. A rigid weighted member 46 is received within the pocket at the free outer edge in the form of an elongate rigid bar which is thicker and denser than the material of the panel to assist the panel in maintaining a substantially vertical orientation when unrolled from the housing. The weighted member also includes a greater thickness than the dimension of the slot between the two bottom flanges 28 such that the free outer edge cannot pass through the slot.

The flexible panel is movable by rotating the shaft between a working position and a stored position. In the working position, a majority of the panel is external of the housing and extends down through the dispensing slot towards the free outer edge at the bottom end thereof, spaced below the housing. In the stored position, a majority of the panel is rolled onto the shaft and enclosed within the interior of the housing while the free outer edge is snugly located against the lower edges of the two bottom flanges 28 at the mouth of the dispensing slot.

A locking assembly 48 permits the shaft and panel to be selectively fixed and retained relative to the housing. The assembly 48 includes a locking collar 50 which is mounted about the shaft adjacent the end of the shaft defining the protruding end portion 38 but at a location internal within the housing spaced inwardly from the respective end cap. The collar receives a set screw 52 threaded radially into the collar for selective engagement with the shaft to fix the collar so that it rotates together with the shaft relative to the housing. The collar includes a plurality of circumferentially spaced sockets 54, for example, two diametrically opposed sockets in the illustrated embodiment, for selective mating with a locking member 56.

The locking member 56 comprises an elongate pin supported threadably within the top wall of the housing for alignment in the lateral direction with the locking collar fixed on the shaft. A longitudinal direction of the pin is oriented to extend radially relative to the shaft in the housing. A central threaded portion of the pin is in threaded connection through a threaded bore 58 in the top wall of the housing.

An external knob portion 60 of the locking member is located at the external end of the threaded portion to provide a gripping surface to be manually gripped by a user.

Opposite the knob portion, the locking member includes an inner end portion 62 internal within the housing for selective mating engagement with a selected one of the sockets 54 when the rotation of the shaft aligns the socket with a pin.

The threaded connection of the pin is such that rotation of the pin about the respective longitudinal axis thereof displaces the pin in the radial direction relative to the shaft between an engaged position and a disengaged position. In the engaged position the inner end portion 62 is received into a respective one of the sockets 54 such that the rotation of the shaft is fixed relative to the housing. In the disengaged position, the end portion 62 is retracted radially outward relative to the collar to be disengaged therefrom such that the shaft is freely rotatable relative to the housing.

The housing is supported on the vehicle by a hitch attachment which is arranged to be selectively supported on a hitching portion of the vehicle such as the hitch receiver 14. More particularly, the hitch attachment comprises a bracket which is secured about the hitch receiver tube at a location between the end flange 16 at the open end of the tube and the cooperating apertures 15 arranged to receive a mounting pin of the hitch stem therethrough. Furthermore, the bracket secures the housing such that the housing is suspended below the hitch receiver tube at the rear of the vehicle, rearward of the rear wheels, with the housing spanning in the lateral direction substantially the full width of the vehicle perpendicularly to the forward working direction of the vehicle.

The bracket of the hitch attachment 64 includes a lower portion 66 which extends laterally along the top wall of the housing to be received against the bottom side of the hitch receiver tube in a mounted position.

The bracket also includes two side portions 68 comprising two legs extending upward from the lower portion 66 of the bracket and from the top wall of the housing at spaced apart positions in the lateral direction to permit the hitch receiver tube to be received snugly therebetween with the two side portions being located adjacent opposing sides of the hitch receiver tube.

An upper portion 70 of the bracket is arranged to be secured to the two side portions 68 using suitable threaded fasteners such that the upper portion is arranged to be clamped overtop of the top side of the hitch receiver tube in the mounted position while the threaded fasteners permit the upper portion to be readily removed and the bracket thus readily separable from the hitch receiver tube as desired.

When the upper portion 70 is fastened to the side portions of the bracket, the bracket is fully clamped about the hitch receiver tube at an intermediate location between the end flange and the cooperating apertures in the hitch receiver tube such that the mounting of the housing on the hitch receiver tube does not interfere with the normal use of the hitch receiver tube. The user is thus permitted to mount the hitch ball using the respective stem into the hitch receiver tube in the usual manner with a towed article then being connected to the hitch ball also in the usual manner.

When towing an article from the hitch of the vehicle, the mud flap panel can be deployed into the working position to protect the article being towed from rocks or other road debris from being thrown rearward from the rear wheels of the vehicle into the article.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A retractable mud flap assembly for a motor vehicle supported on wheels for movement in a forward working direction, the assembly comprising:
   a housing extending in a lateral direction between two opposing ends;
   a hitch attachment arranged to suspend the housing from a hitching portion of the vehicle rearward of the wheels such that the lateral direction is perpendicular to the forward working direction of the vehicle;
   a shaft supported by the housing for rotation about an axis of the shaft oriented in the lateral direction; and
   a mud flap panel spanning longitudinally between an inner edge secured to the shaft and an opposing free outer edge;
   the mud flap panel being formed of a flexible material so as to be movable between a working position depending downwardly from the housing towards the free outer edge and a stored position rolled onto the shaft; and
   the hitch attachment comprising a bracket arranged to be secured about a hitch receiver tube on the vehicle in a manner which does not interfere with mounting of a hitch ball relative to the hitch receiver tube.

2. The assembly according to claim 1 wherein the hitch attachment is arranged to wholly suspend the housing from the hitching portion of the vehicle such that the housing is only supported on the hitching portion of the vehicle.

3. A retractable mud flap assembly for a motor vehicle supported on wheels for movement in a forward working direction, the assembly comprising:
   a housing extending in a lateral direction between two opposing ends;
   a hitch attachment arranged to suspend the housing from a hitching portion of the vehicle rearward of the wheels such that the lateral direction is perpendicular to the forward working direction of the vehicle;
   a shaft supported by the housing for rotation about an axis of the shaft oriented in the lateral direction; and
   a mud flap panel spanning longitudinally between an inner edge secured to the shaft and an opposing free outer edge;
   the mud flap panel being formed of a flexible material so as to be movable between a working position depending downwardly from the housing towards the free outer edge and a stored position rolled onto the shaft; and
   the hitch attachment comprising a bracket arranged to be secured about the hitching portion of the vehicle using threaded fasteners such that the housing is selectively separable from the vehicle.

4. The assembly according to claim 1 wherein the housing is fully enclosed about the shaft.

5. The assembly according to claim 1 wherein the housing includes two flanges spanning laterally between the opposing ends parallel to one another to define a dispensing slot therebetween and wherein the mud flap panel is received through the dispensing slot between the two flanges.

6. The assembly according to claim 5 wherein the mud flap panel includes a portion of increased thickness at the outer free edge which cannot pass through the dispensing slot.

7. A retractable mud flap assembly for a motor vehicle supported on wheels for movement in a forward working direction, the assembly comprising:
   a housing extending in a lateral direction between two opposing ends;
   a hitch attachment arranged to suspend the housing from a hitching portion of the vehicle rearward of the wheels such that the lateral direction is perpendicular to the forward working direction of the vehicle;
   a shaft supported by the housing for rotation about an axis of the shaft oriented in the lateral direction; and
   a mud flap panel spanning longitudinally between an inner edge secured to the shaft and an opposing free outer edge;
   the mud flap panel being formed of a flexible material so as to be movable between a working position depending downwardly from the housing towards the free outer edge and a stored position rolled onto the shaft; and
   the mud flap panel further comprising a rigid weighted member spanning along the outer free edge along a full width of the panel in the lateral direction.

8. A retractable mud flap assembly for a motor vehicle supported on wheels for movement in a forward working direction, the assembly comprising:
   a housing extending in a lateral direction between two opposing ends;
   a hitch attachment arranged to suspend the housing from a hitching portion of the vehicle rearward of the wheels such that the lateral direction is perpendicular to the forward working direction of the vehicle;
   a shaft supported by the housing for rotation about an axis of the shaft oriented in the lateral direction;
   a mud flap panel spanning longitudinally between an inner edge secured to the shaft and an opposing free outer edge;
   the mud flap panel being formed of a flexible material so as to be movable between a working position depending downwardly from the housing towards the free outer edge and a stored position rolled onto the shaft; and
   a tool attachment portion supported at one end of the shaft so as to be arranged selective attachment to an auxiliary handle member for manually driving rotation of the shaft.

9. The assembly according to claim 8 wherein the tool attachment portion protrudes outwardly beyond the housing in the lateral direction.

10. The assembly according to claim 8 wherein the tool attachment portion comprises an end portion of the shaft having a cross section perpendicular to the lateral direction which is polygonal.

11. A retractable mud flap assembly for a motor vehicle supported on wheels for movement in a forward working direction, the assembly comprising:
   a housing extending in a lateral direction between two opposing ends;
   a hitch attachment arranged to suspend the housing from a hitching portion of the vehicle rearward of the wheels such that the lateral direction is perpendicular to the forward working direction of the vehicle;
   a shaft supported by the housing for rotation about an axis of the shaft oriented in the lateral direction;
   a mud flap panel spanning longitudinally between an inner edge secured to the shaft and an opposing free outer edge;
   the mud flap panel being formed of a flexible material so as to be movable between a working position depending downwardly from the housing towards the free outer edge and a stored position rolled onto the shaft; and
   a locking member supported on the housing for movement in a radial direction relative to the shaft between a disengaged position in which the shaft is freely rotatable and an engaged position in which the locking member engages to the shaft so as to prevent rotation of the shaft relative to the housing.

12. The assembly according to claim 11 wherein the locking member is in threaded connection with the housing such that rotation of the locking member about a respective longitudinal axis displaces the locking member in the radial direction relative to the shaft.

13. The assembly according to claim 11 further comprising a plurality of sockets at circumferentially spaced apart positions on the shaft, wherein the locking member comprises an inner end portion arranged to be received in a selected one of the sockets in the engaged position.

14. A retractable mud flap assembly for a motor vehicle supported on wheels for movement in a forward working direction, the assembly comprising:
   a housing extending in a lateral direction between two opposing ends and being arranged to be supported on the vehicle rearward of the wheels such that the lateral direction is perpendicular to the forward working direction of the vehicle;
   a shaft supported by the housing for rotation about an axis of the shaft oriented in the lateral direction; and
   a mud flap panel spanning longitudinally between an inner edge secured to the shaft and an opposing free outer edge;
   the mud flap panel being formed of a flexible material so as to be movable between a working position depending downwardly from the housing towards the free outer edge and a stored position rolled onto the shaft;
   the housing being fully enclosed about the shaft;
   the housing including two flanges spanning laterally between the opposing ends parallel to one another to define a dispensing slot therebetween;
   the mud flap panel being received through the dispensing slot between the two flanges; and
   the mud flap panel including a portion of increased thickness at the outer free edge which cannot pass through the dispensing slot.

15. A retractable mud flap assembly for a motor vehicle supported on wheels for movement in a forward working direction, the assembly comprising:
   a housing extending in a lateral direction between two opposing ends and being arranged to be supported on the vehicle rearward of the wheels such that the lateral direction is perpendicular to the forward working direction of the vehicle;
   a shaft supported by the housing for rotation about an axis of the shaft oriented in the lateral direction;
   a mud flap panel spanning longitudinally between an inner edge secured to the shaft and an opposing free outer edge; and
   a tool attachment portion supported at one end of the shaft so as to be arranged selective attachment to an auxiliary handle member;
   the mud flap panel being formed of a flexible material so as to be movable between a working position depending downwardly from the housing towards the free outer edge and a stored position rolled onto the shaft.

16. The assembly according to claim 15 wherein the tool attachment portion comprises an end portion of the shaft having a cross section perpendicular to the lateral direction which is polygonal and protrudes outwardly beyond the housing in the lateral direction.

17. The assembly according to claim 15 further comprising a locking member supported on the housing for movement in a radial direction relative to the shaft between a disengaged position in which the shaft is freely rotatable and an engaged position in which the locking member engages to the shaft so as to prevent rotation of the shaft relative to the housing.

18. The assembly according to claim 15 further comprising:
   the housing being fully enclosed about the shaft;
   the housing including two flanges spanning laterally between the opposing ends parallel to one another to define a dispensing slot therebetween; and
   the mud flap panel being received through the dispensing slot between the two flanges.

* * * * *